(12) United States Patent
Garcia et al.

(10) Patent No.: US 7,103,744 B2
(45) Date of Patent: Sep. 5, 2006

(54) BINDING A MEMORY WINDOW TO A QUEUE PAIR

(75) Inventors: David J. Garcia, Los Gatos, CA (US); Jeffrey R. Hilland, Cypress, TX (US); Paul R. Culley, Tomball, TX (US); Dwight L. Barron, Houston, TX (US); Michael R. Krause, Boulder Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 10/401,235

(22) Filed: Mar. 27, 2003

(65) Prior Publication Data

US 2004/0193825 A1   Sep. 30, 2004

(51) Int. Cl.
*G06F 12/00* (2006.01)
*G06F 13/28* (2006.01)

(52) U.S. Cl. .................. 711/170; 711/163; 710/22

(58) Field of Classification Search ............... 711/163, 711/100, 154, 170; 710/22–28
See application file for complete search history.

(56) References Cited

U.S. PATENT DOCUMENTS

| | | | |
|---|---|---|---|
| 5,325,532 A | 6/1994 | Crosswy et al. | |
| 5,577,211 A * | 11/1996 | Annapareddy et al. | ..... 709/232 |
| 5,675,807 A | 10/1997 | Iswandhi et al. | |
| 5,737,604 A | 4/1998 | Miller et al. | |
| 5,751,932 A | 5/1998 | Horst et al. | |
| 5,809,285 A | 9/1998 | Hilland | |
| 5,815,707 A | 9/1998 | Krause et al. | |
| 5,822,571 A | 10/1998 | Goodrum et al. | |
| 5,870,568 A | 2/1999 | Culley et al. | |
| 5,872,941 A | 2/1999 | Goodrum et al. | |
| 5,914,953 A | 6/1999 | Krause et al. | |
| 5,948,111 A | 9/1999 | Taylor et al. | |
| 5,964,835 A | 10/1999 | Fowler et al. | |
| 5,983,269 A | 11/1999 | Mattson et al. | |
| 6,018,620 A | 1/2000 | Culley et al. | |
| 6,047,323 A | 4/2000 | Krause | |
| 6,070,198 A | 5/2000 | Krause et al. | |
| 6,070,253 A | 5/2000 | Tavallaei et al. | |
| 6,157,967 A | 12/2000 | Horst et al. | |
| 6,163,834 A | 12/2000 | Garcia et al. | |
| 6,233,702 B1 | 5/2001 | Horst et al. | |
| 6,484,208 B1 | 11/2002 | Hilland | |
| 6,493,343 B1 | 12/2002 | Garcia et al. | |
| 6,496,940 B1 | 12/2002 | Horst et al. | |
| 6,502,203 B1 | 12/2002 | Barron et al. | |
| 6,859,867 B1 * | 2/2005 | Berry | ..................... 711/206 |

FOREIGN PATENT DOCUMENTS

EP   0757318 A2   2/1997

* cited by examiner

*Primary Examiner*—Tuan V. Thai

(57) ABSTRACT

The disclosed embodiments may relate to memory window access and may include a memory window and plurality of queue pairs associated with a process. Each of the plurality of queue pairs may be associated with a memory window context that may have queue pair information. The memory window may be associated with a memory window context that includes a protection information field. Accordingly, access to memory window may be allowed if the queue pair information matches the protection information field.

22 Claims, 4 Drawing Sheets

BINDING A MEMORY WINDOW TO A QUEUE PAIR

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. Queue pairs ("QPs") may be used to facilitate such a transfer of data. Each QP may include a send queue ("SQ") and a receive queue ("RQ") that may be utilized in transferring data from the memory of one device to the memory of another device. The QP may be defined to expose a segment of the memory within the local system to a remote system. Memory windows ("MWs") may be used to ensure that memory exposed to remote systems may be accessed by designated QPs. Protection domains ("PDs") may be used to restrict the access to memory windows associated with a designated QP. For example, access to a memory window may be restricted to all the QPs assigned to the same Protection Domain. In a large system, all QPs of a single process may be assigned to a single protection domain ("PD").

However, in a multi-client computing environment, each client may be services by a thread of the same process. If multiple clients use the same protection domain, other clients may be enabled to access and interfere with the remote memory segment attached to a memory window bound by a specific QP. Thus, system security may be compromised or system performance degraded.

BRIEF DESCRIPTION OF THE DRAWINGS

The foregoing and other advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
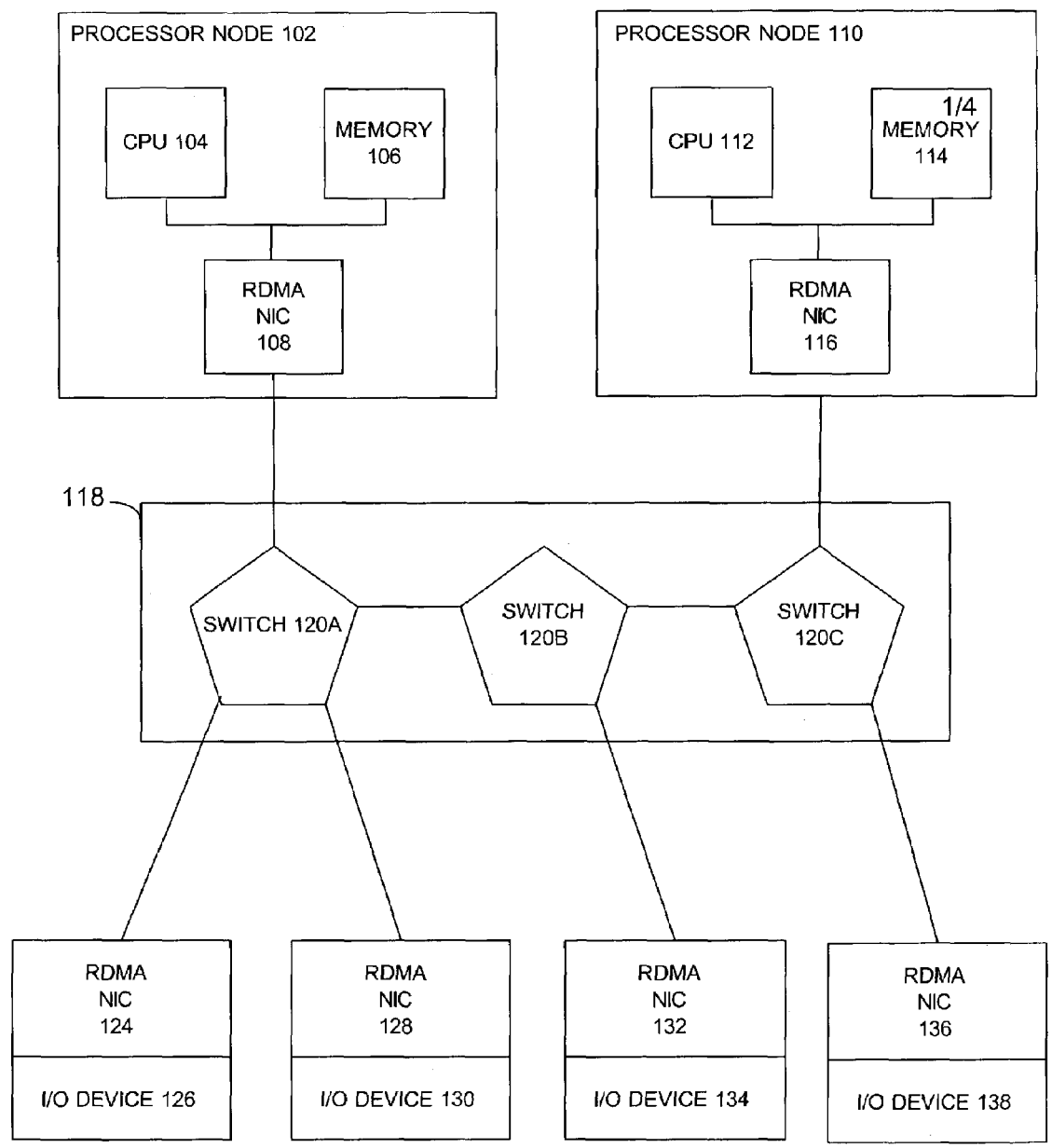
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A–120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
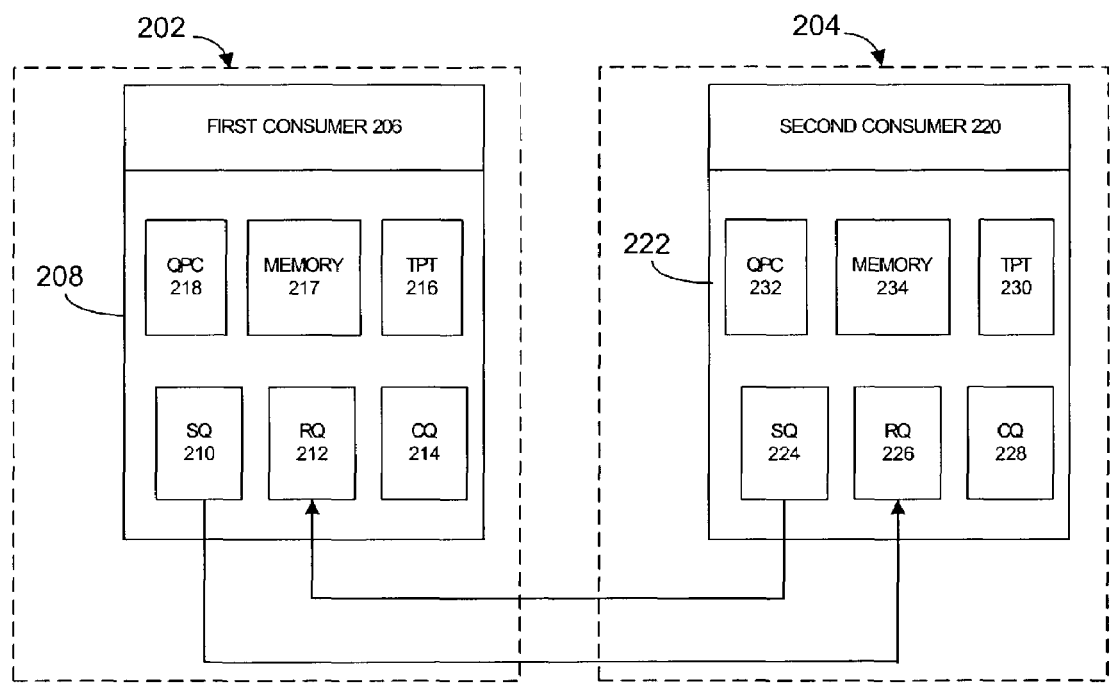
FIG. 2 is a block diagram that illustrates the use of a queue pair to transfer data between devices in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first consumer 206, which may interact with an RNIC 208. The first consumer 206 may comprise a software process that may interact with various components of the RNIC 208. The RNIC 208, may correspond to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218. The memory 217 may be a portion of the memory 106 or 114 of FIG. 1 within the first node 202, or a separate portion of memory within the RNIC 208.

The second node 204 may include a second consumer 220, which may interact with an RNIC 222. The second consumer 220 may comprise a software process that may interact with various components of the RNIC 222. The RNIC 222, may correspond to one of the RNICs 108, 116, 126, 130, 134 or 138 (FIG. 1), depending on which of devices associated with those RNICs is participating in the data transfer. The RNIC 222 may comprise a send queue 224, a receive queue 226, a completion queue 228, a TPT 230, a memory 234 and a QP context 232. The memory 234 may be a portion of the memory 106 or 114 of FIG. 1 within the second node 204, or a separate portion of memory within the RNIC 222.

The memories 217 and 234 may be registered to different processes, each of which may correspond to the consumers 206 and 220. The queues 210, 212, 214, 224, 226, or 228 may be used to transmit and receive various verbs or commands, such as control operations or transfer operations. The completion queue 214 or 228 may store information regarding the sending status of items on the send queue 210 or 224 and receiving status of items on the receive queue 212 or 226. The TPT 216 or 230 may comprise a simple table or an array of page specifiers that may include a variety of configuration information in relation to the memories 217 or 234.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD") in a protection domain field, access rights, send queue information, receive queue information, completion queue information, or information about a local port connected to the QP and/or remote port connected to the QP. However, it should be appreciated that the RNIC 208 or 222 may include multiple QPs that support different consumers with the QPs being associated with one of a number of CQs.

To prevent interferences in the memories 217 or 234, the memories 217 or 234 may be divided into memory regions ("MRs"), which may contain memory windows ("MWs"). An entry in the TPT 216 or 230 may describe the memory regions and may include a virtual to physical mapping of a portion of the address space allocated to a process. These memory regions may be registered with the associated RNIC and the operating system. The nodes 202 and 204 may send a unique steering tag ("STag") to identify the memory to be accessed, which may correspond to the memory region or memory window.

The STag may be used to identify a buffer that is being referenced for a given data transfer. A tagged offset ("TO") may be associated with the STag and may correspond to an offset into the associated buffer. The message sequence number may be a 32-bit field that may be used as a sequence number for a communication, while the message offset may be a 32-bit field offset from the start of the message.

Also, the node 202 or 204 may have a unique QP identity for communications with the other node 202 or 204. By using a region STag to access to the memory region over the designated QP, the access may be restricted to STags that have the same PD. Memory windows may also be defined in the memories 217 and 234 to allow flexible and efficient access control to the memory regions. With a memory window, a process may use a send queue to bind a pre-allocate window or segment of memory to a specified portion of the memory region. The memory window may be accessed by the QP that used its send queue to bind the window. Thus, the memory region and memory window may be utilized to restrict the memory that the various QPs may access within the memory 217 or 234. In this manner, QPs may avoid interference with one another. The interaction between QPs, PDs, MRs, MWs in the context of data transfers employing multiple QPs is explained with reference to FIG. 3.

Figure 3:
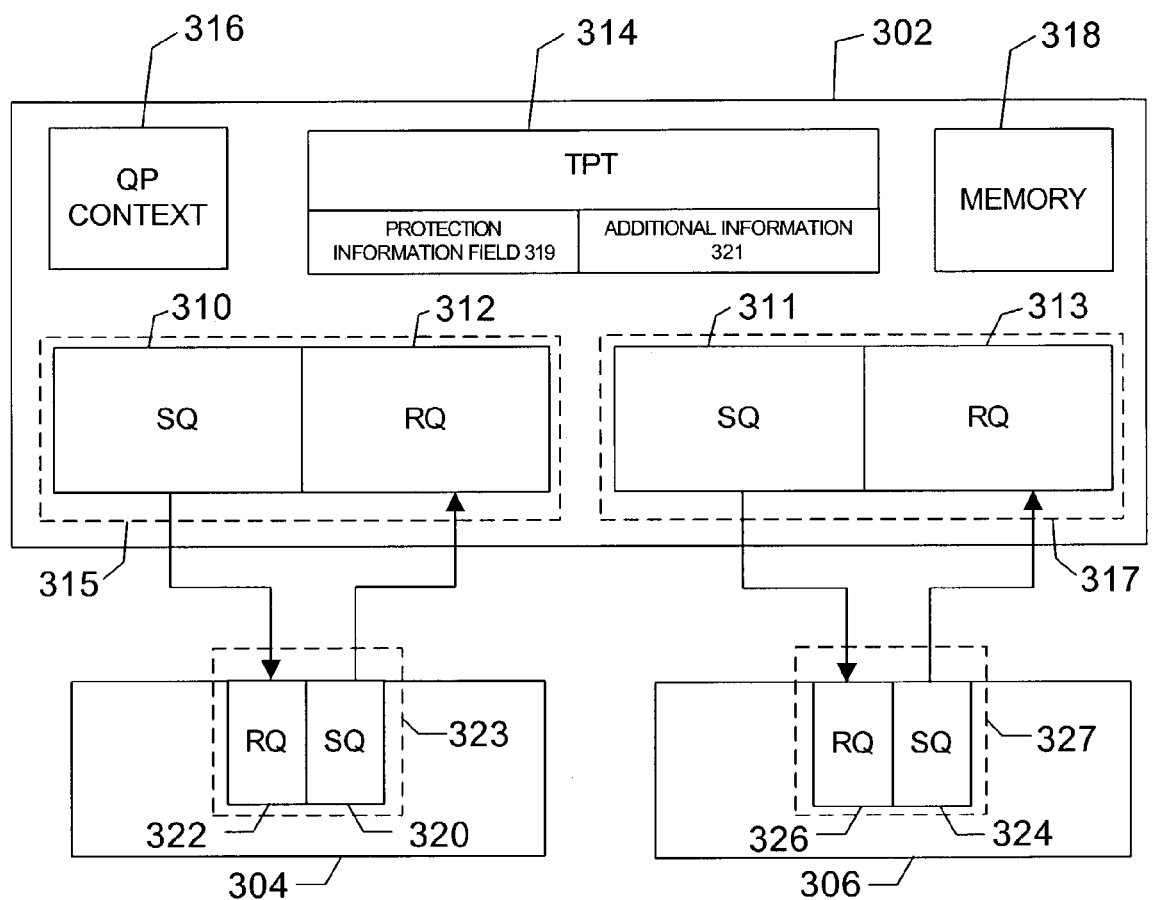
FIG. 3 is a block diagram illustrating data exchange using multiple queue pairs in accordance with embodiments of the present invention.

FIG. 3 is a block diagram illustrating data exchange using multiple queue pairs in accordance with embodiments of the present invention. The diagram is generally referred to by the reference numeral 300. A process or application may be operating on a server node 302, which may correspond to one of the nodes 202 or 204 (FIG. 2). The server node 302 may include a first send queue 310, a second send queue 311, a first receive queue 312 and a second receive queue 313, which may be similar to the queues 212 and 214 of FIG. 2. The use of two sets of send queues and receive queues indicates that two sets of QPs have been established for communication between the server node 302 and other devices. The send queue 310 and the receive queue 312 together form a QP that is identified by the reference numeral 315. The send queue 311 and the receive queue 313 together form a QP that is identified by the reference numeral 317.

The QP 315 may be adapted to exchange information with a corresponding QP 323, which may comprise a send queue 320 and a receive queue 322. The QP 323 may be located in a node 304, which may correspond to a device with which the server node 302 is exchanging information. The arrows between the send queue 310 and the receive queue 322 and between the send queue 320 and the receive queue 312 indicate the flow of information therebetween. Similarly, the QP 317 may be adapted to exchange information with a corresponding QP 327, which may comprise a send queue 324 and a receive queue 326. The QP 327 may be located in a node 306, which may correspond to a device with which the server node 302 is exchanging information. The arrows between the send queue 311 and the receive queue 326 and between the send queue 324 and the receive queue 313 indicate the flow of information therebetween.

The QPs 315 and 317 may be associated with a TPT 314, which may correspond to the TPT 216 of FIG. 2. A QP context 316 may correspond to the QP context 218 of FIG. 2. The TPT 314 may store information relating to memory regions, memory windows and multiple physical address tables ("PATs") associated with a memory 318. The TPT 314 may also include fields, such as a protection domain field 319 and additional information 321, which may comprise access control information, physical address table size, page size, virtual address, first page offset, length, an STag, a physical address table pointer and the like.

In an exemplary communication with the server node 302, the nodes 304 and 306 may send a unique STag to identify the memory to be accessed, such as STagA and STagB. The QP 315 may be used to access a memory window, which may be referred to as MWA, in memory 318 on the server node 302. The QP 317 may be used to access a memory window, which may be referred to as MWB, on the server node 302. The process on the server node 302 may have defined thereon a protection domain, which may be referred to as PDA, for both of the QPs 315 and 317. The protection domain information for the QPs 315 and 317 may be stored in the protection domain field 319 of the TPT 314. The protection domain data stored in the protection information field 319 may be related to a process or queue pair and may be located in any of the entries of the TPT 314, the queue pair context, or other similar components. The protection information field 319 may comprise a portion of a memory window context or the like.

Because MRA and MRB may be assigned a protection domain value corresponding to PDA within the server node 302, MRA and MRB may be accessed from queue pairs 315 and 317. Accordingly, if the access to the memory region MRA or MRB is verified against the protection domain PDA, then both the QPs 315 and 317 may access the memory regions MRA and MRB. Thus, the verification process for accessing a memory region MRA may not prevent other queue pairs such as the QP 317 from accessing the memory region MRA that is designated for the QP 315.

To provide security protection between the various clients that may be accessing the portion of the memory 318 that is allocated to them, a memory window access mechanism or process may associate a queue pair with a specific memory window when the memory window is bound to help ensure that designated memory window may be accessed by a designated QP 315 or 317. During the binding of a memory window, the protection information field 319 may be loaded with queue pair information. As a result, the protection information field may include protection domain information and queue pair information or queue pair information. Similarly, the queue pair information may comprise an identifying or predefined value that corresponds to the specific queue pair, and may be unique to that queue pair at a node.

The protection information field 319 may comprise a protection domain number and/or a queue pair number for a specific entry in the TPT 314. The protection information field 319 may be configured, set or written to when a command or verb (such as a "Bind Window" verb, for example) is invoked to bind the memory window. Such a verb may alter the contents of the protection information field 319 within the TPT 314 to correspond to the queue pair that bound the memory window. Accordingly, the protection information field 319 may be used in checking the QP when verifying whether memory access through the specified memory window is permitted. The protection information field 319 may indicate that the QP 315 or 317 that formed the memory window is the appropriate QP to access the memory 318.

By way of example, the nodes 304 and 306 may be accessing memory windows within the server node 302. Within the server node 302, the node 304 may communicate over QP 315 that has a protection domain PDA and memory window MWA. Also, within the server node 302, the node 306 may communicate over QP 317 that has a protection domain PDA and memory window MWB. In binding the memory window, the protection information field 319 may be modified to include the information that corresponds to the queue pair that is binding the memory window. If the QP 315 binds the memory window, then the protection information field 319 may indicate that the QP 315 may have exclusive access to the memory window MWA. For instance, if QP 317 attempts to access the memory window MWA, then the QP information of QP 317 may be verified against the protection information field 319 that include the QP information of QP 315. As a result, the access to the memory window MWA may be denied for QP 317. Similarly, if the QP 315 attempts to access the memory window MWA, then the QP information of QP 315 may be verified against the protection information field 319 that include the QP information of QP 315. Accordingly, the QPs 315 may be verified and allowed access to memory window MWA.

Figure 4:
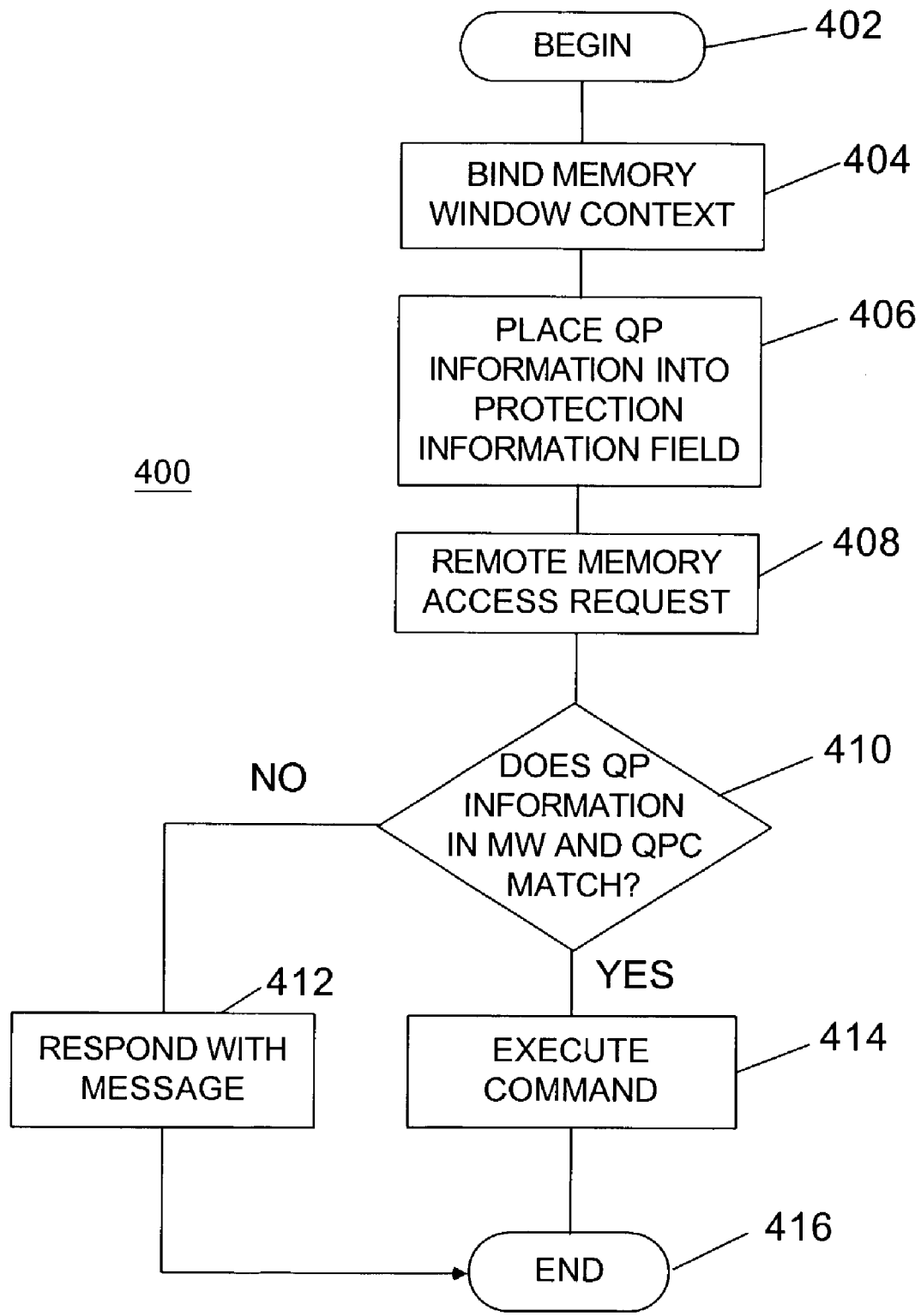
FIG. 4 illustrates a flow chart of computer network in accordance with embodiments of the present invention.

Turning to FIG. 4, a flow diagram is illustrated in accordance with embodiments of the present invention. In the diagram, generally referred to by reference numeral 400, a protection information field in a TPT may be implemented and may be utilized in a system, such as a computer system. The process begins at block 402. At block 404, a memory window context may be set to indicate the memory window is bound to a memory region. The memory window context may be within a TPT, such as the TPT 314 in FIG. 3, and may be bound from a verb or command that is received or another similar type operation.

The protection information field in the memory window context may be modified to include the queue pair information for the specific QP that binds the memory window, such as QP 315 or 317 of FIG. 3, as shown in block 406. The queue pair information field may be included in a request, a verb, or command that binds the memory window in the TPT, as discussed above with regard to FIG. 3. For instance, in a specific process, the memory window context in the TPT may include the QP information for the QP that requested the binding of the memory window.

When a remote memory access begins at block 408, the memory access rights may be validated through various processes. At block 410, the QP information in the memory window context may be verified against the QP information within the queue pair context ("QPC"). If QPs in the memory window context and the QP context do not a match, then the system may respond to the request at block 412. The response to the request may include terminating the connection or sending an invalid request message. However, if the QPs in the memory window context and the QP context are a match, then the command may be executed in block 414. The execution of the command may include accessing the memory segment through the memory window. Accordingly, the process ends at block 416.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A memory window access mechanism, comprising:
    a plurality of queue pairs associated with a process, each of the plurality of queue pairs being associated with a queue pair context that comprises queue pair information; and
    a send queue configured to bind a memory window associated with the process, the memory window being disposed in a memory region and associated with a memory window context that comprises a protection information field, the memory window context allowing access to the memory window if the queue pair information corresponds to the protection information field.

2. The memory window access mechanism set forth in claim 1, wherein the queue pair context comprises a protection domain field.

3. The memory window access mechanism set forth in claim 1, wherein the memory window context is defined as an entry in a memory translation and protection table ("TPT").

4. The memory window access mechanism set forth in claim 1, wherein the protection information field includes an identifying value associated with one of the plurality of queue pairs.

5. The memory window access mechanism set forth in claim 1, wherein the protection information field defines whether to allow access to the memory window by the plurality of queue pairs or by a subset of the plurality of queue pairs.

6. The memory window access mechanism set forth in claim 1, wherein the protection information field defines whether to allow access to the memory window by the one of the plurality of queue pairs.

7. The memory window access mechanism set forth in claim 1, wherein a verb binds the memory window for one of the plurality of queue pairs.

8. The memory window access mechanism set forth in claim 1, queue pair information is included in the protection information field when the memory window is bound.

9. A computer network, comprising:
    a plurality of computer systems;
    at least one input/output device;
    a switch network that connects the plurality of computer systems and the at least one input/output device for communication; and
    wherein the plurality of computer systems and the at least one input/output device comprises a memory window access mechanism, the memory window access mechanism comprising:
        a plurality of queue pairs associated with a process, each of the plurality of queue pairs being associated with a queue pair context that comprises queue pair information; and
        a send queue configured to bind a memory window associated with the process, the memory window being disposed in a memory region and associated with a memory window context that comprises a protection information field, the memory window context allowing access to the memory window if the queue pair information corresponds to the protection information field.

10. The computer network set forth in claim 9, wherein the queue pair context comprises a protection domain field.

11. The computer network set forth in claim 9, wherein the memory window context is defined as an entry in a memory translation and protection table ("TPT").

12. The computer network set forth in claim 9, wherein the protection information field includes an identifying value associated with one of the plurality of queue pairs.

13. The computer network set forth in claim 9, wherein the protection information field defines whether to allow access to the memory window by the plurality of queue pairs or by a subset of the plurality of queue pairs.

14. The memory window access mechanism set forth in claim 9, wherein a verb binds the memory window for one of the plurality of queue pairs.

15. The computer network set forth in claim 9, wherein a verb binds the memory window for one of the plurality of queue pairs.

16. The computer network set forth in claim 15, wherein queue pair information is included in the protection information field when the memory window is bound.

17. A method for providing access to a memory window, the method comprising the acts of:
    defining a plurality of queue pairs that correspond with a protection domain, each of the plurality of queue pairs being associated with a queue pair context that comprises queue pair information;
    utilizing a send queue to bind a memory window, the memory window being disposed in a memory region and associated with a memory window context that comprises a protection information field that enables access to the memory window by at least one of the plurality of queue pairs; and validating the queue pair information in the queue pair context against protection information field to enable access to the memory window to the at least one of the plurality of queue pairs.

18. The method set forth in claim 17, comprising issuing a verb to bind the memory window for one of the plurality of queue pairs.

19. The method set forth in claim 17, comprising placing the queue pair information into the protection information field when the queue pair is bound.

20. The method set forth in claim 17, comprising defining the memory window context in a memory translation and protection table ("TPT").

21. The method set forth in claim 17, comprising accessing memory through the memory window if the queue pair information in the queue pair context is validated against protection information field.

22. The method set forth in claim 17, comprising responding with a message if the validation of the queue pair information against protection information field fails.

* * * * *